March 4, 1958 J. D. CONTI 2,825,223
FLEX TESTER
Filed June 30, 1955 2 Sheets-Sheet 1

March 4, 1958  J. D. CONTI  2,825,223
FLEX TESTER
Filed June 30, 1955  2 Sheets-Sheet 2
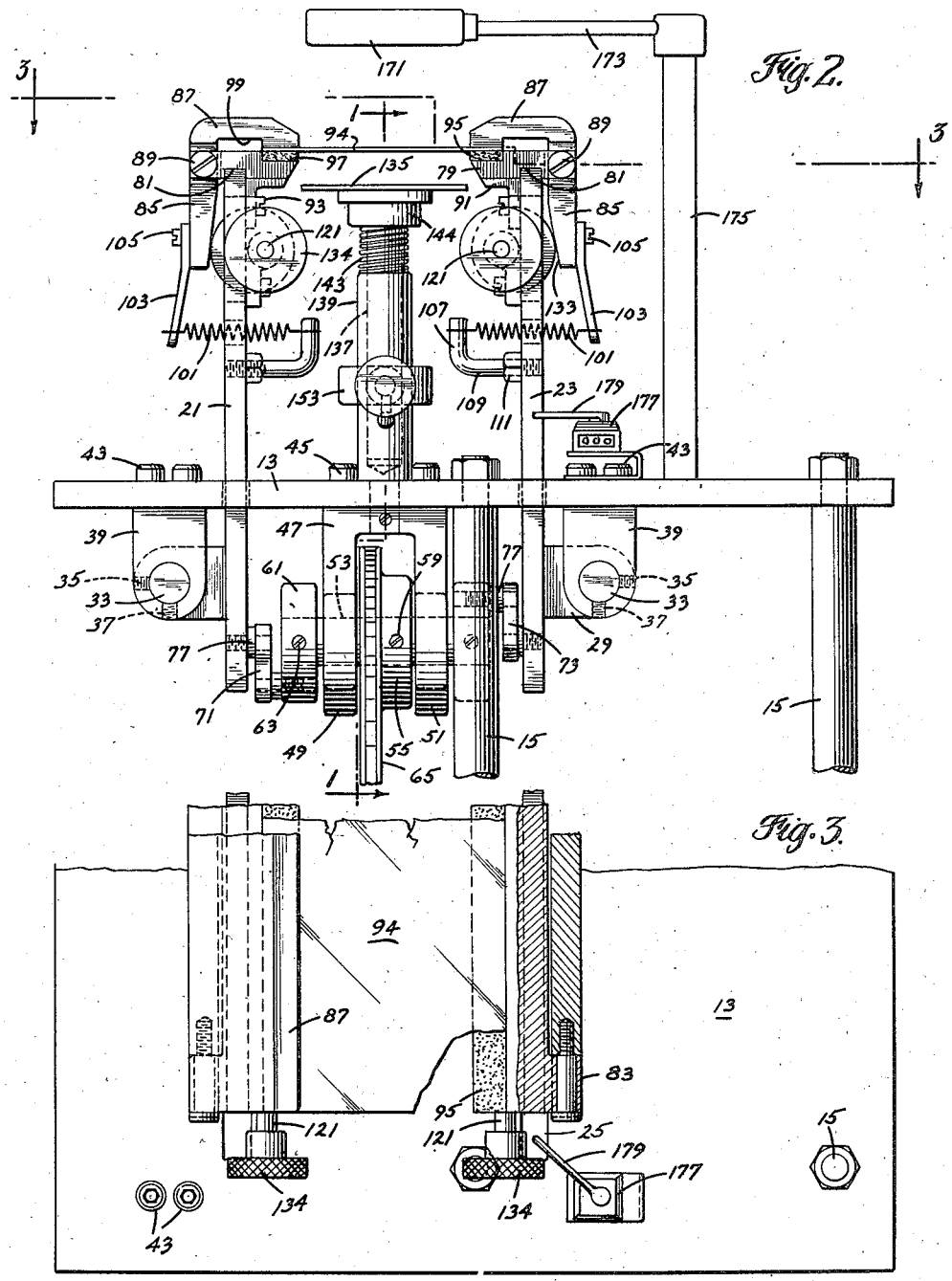

United States Patent Office 2,825,223
Patented Mar. 4, 1958

2,825,223

FLEX TESTER

John D. Conti, Elkins Park, Pa., assignor to American Viscose Corporation, Philadelphia, Pa., a corporation of Delaware Application June 30, 1955, Serial No. 519,209

3 Claims. (Cl. 73—91)

The invention relates to a testing apparatus for determining the flexural durability of sheet materials.

In ascertaining the flexural durability of various sheets, and particularly cellophane film, one of the earliest and existing methods has been to repeatedly flex the material by hand until rupture of the sheet or film occurred. With an experienced technician, testing by hand flexing produced results fairly indicative of the true character of the sample tested. However, the human element and the uncontrolled testing conditions involved in known methods of testing, often resulted in data which were inaccurate or not as precise as desired. Wide variations even with the same testing technician often occurred. It is therefore a primary object to provide a more satisfactory testing apparatus for determining the flexural strength of sheet materials.

Another object is the provision of a testing apparatus adapted to automatically subject sheet material to repeated and uniform flexures while buoyantly supporting the central area of the same.

A further object is the provision of a sheet material testing apparatus having a heated air stream directed toward one side of the sheet material tested and serving to indicate the first sign of rupture of the test sample.

A still further object is the provision of a testing apparatus which is simple in construction and operation, is adapted for use in various controlled test conditions under which testing is normally conducted and has a counter mechanism for automatically recording the number of flexing strokes to which the test sample is subjected.

These and other objects and advantages of the invention will be apparent from the following description and accompanying drawing in which:

Fig. 2 is a front view of the portion of the structure shown in Fig. 1, with the test sample supporting plate in retracted position; and Fig. 3 is a fragmentary top view of the structure illustrated in Fig. 2 with a portion thereof shown in section, taken along the line III—III of Fig. 2.

Figure 1:
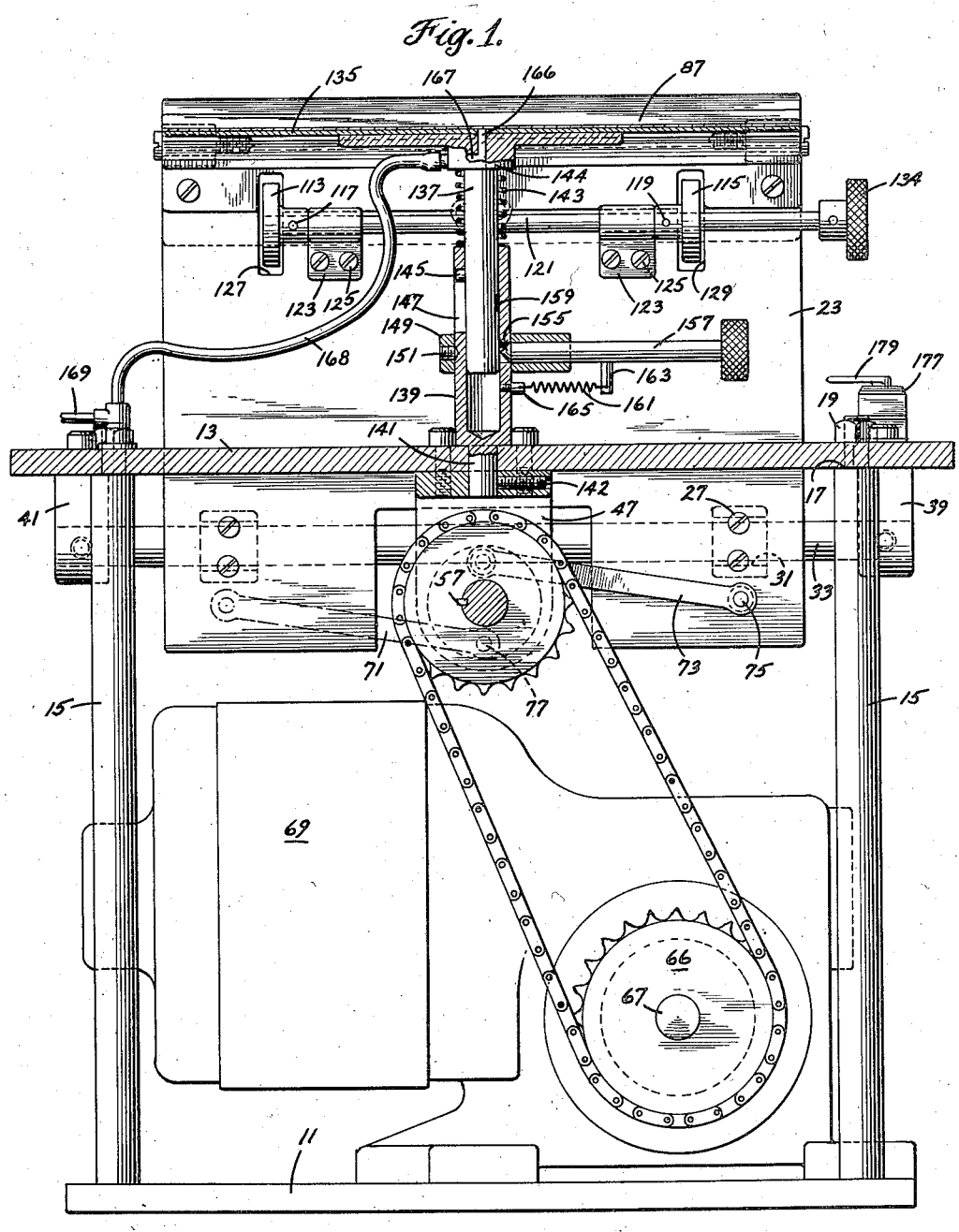
Fig. 1 is a longitudinal vertical section taken approximately along the line I—I of Fig. 2, with the sheet material supporting plate in elevated position.

The flexure testing apparatus of the present invention includes a plate on which the test sample is temporarily supported while its longitudinal edges are engaged by a pair of gripping jaws, each of which is carried on the upper end of a reciprocating side wall. Once the test sample is positioned within the apparatus, the plate is retracted and the central area of the sample is maintained in an even plane by a heated air stream as the jaws are reciprocated by an eccentric drive system to repeatedly flex the sample. The flexing strokes to which the sample is subjected are automatically recorded on a counter mechanism, and the first sign of sample rupture are indicated by the passage of air through the sample itself and onto a glass or metallic plate which is thereby caused to fog.

With reference to the preferred form of the invention shown in the drawings, the apparatus includes a structural frame-work formed of a base plate 11, a top plate or table 13, and a plurality of columns or struts 15 extending vertically between the plates 11 and 13. The lower ends of the struts 15 may be secured to the base plate 11 by any suitable means, as for example welding, while their upper ends are preferably of reduced diameter and externally threaded to facilitate clamping of the table 13 between the shoulders 17 and the nuts 19.

A pair of spaced parallel side plates or walls 21 and 23 project vertically upward through a pair of elongated openings or slots 25 formed in the table 13, which are of sufficient dimensions to permit unrestricted reciprocating movement of the side plates 21 and 23 relative to the table 13 as hereinafter described. On the outer surface of each of the side plates 21 and 23, adjacent their lower edges, are fixed, as by screws 27, a pair of spaced outwardly projecting blocks or brackets 29 having aligned circular bearing surfaces 31 which are slidably engaged with the horizontal guide bars or rods 33. The opposite ends of the bars 33 are secured by set screws 35 and 37 to the brackets 39 and 41, which in turn are suspended from the under surface of the table 13 by conventional socket head bolts 43.

Suspended also from the under surface of the table 13, by bolts 45, is a bifurcated bearing block 47 having arms 49 and 51 through which a rotatable shaft 53 passes. A sprocket 55 is keyed at 57 to the shaft 53 between the arms 49 and 51 and is fixed in its axial position by a set screw 59, while a circular drive wheel 61 is fixed to each of the outer ends of the shaft 53 by set screws 63. The sprocket 55 is driven by a link chain 65 trained over the sprockets 55 and 66, the latter of which is fixed to the shaft 67 of a suitable electric motor 69. The rotary movements of the sprocket 55 and the wheels 61 is converted into a reciprocating motion and conveyed to the side plates 21 and 23 by levers 71 and 73, respectively, having their ends rotatably mounted on the crank pins 75 and 77 threaded into the side plates 21 and 23 and the drive wheels 61 as best seen in Figs. 1 and 2. The pins 77 are mounted eccentrically of the wheels 61 and are 180° out of phase relative to each other so that the side plates are reciprocated in opposite directions as the sprocket 55 drives the wheels 61. While the lever 71 would not normally be seen in the section shown in Fig. 1, it is shown in broken lines to more clearly illustrate its phase relationship with the corresponding lever 73 of the side plate 21.

To the top edges of each of the side walls 21 and 23 is secured the sheet material or film gripping mechanism including a lower gripping jaw 79 notched at 81 and having on its outer side a pair of spaced projecting ears 83 between which the tongue or vertical flange 85 of the upper jaw 87 is pivotally mounted by the partially threaded screws 89. The portions of the lower jaw 79 projecting between the side plates 21 and 23 are reinforced against bending by angle bars 91, each of which has one flange bearing against and preferably secured to the under surface of the lower jaw and a vertical flange fixed to the inner surface of the side plates 21 and 23 by screws 93. To insure firm gripping of the edges of the sheet 94 to be tested, the jaws 79 and 87 extend coextensively with the walls 21 and 23, with the upper surface of the jaw 79 being provided with a friction strip 95, as for example of rubber, bonded within the recess 97, while the under surface of the jaw 87 is recessed at 99 to permit the jaw to flex slightly when the gripping mechanism is moved into a clamping position.

The gripping mechanism is normally maintained in open position by a tension spring 101, acting on the upper jaw 87. The springs 101 have their outermost ends secured to the lower ends of the downwardly and outwardly extending arms 103 fixed, as by screws 105, to the lower portions of the flanges 85, while the opposite ends of the springs are hooked onto the vertical legs 107 of the L-shaped bolts 109 threaded into the side walls 21 and 23 and prevented from rotating by the lock nuts 111. Each of the jaws 87 is urged into and held in closed or gripping position by a pair of cams 113 and 115 pinned at 117 and 119 to the actuating shafts 121, each of which is rotatably supported by the bearing blocks 23 screwed at 125 to the inner faces of the respective side walls. The cams 113 and 115 project through vertical slots 127 and 129 formed in the side walls and engage with the outwardly inclined surfaces 133 of the flanges 85. Upon rotation of the shaft 121 by the knurled knob 134, the cams 113 and 115 overcome the force of the springs 101 and urge the upper jaw 87 into gripping position as shown in Fig. 2.

In positioning the sheet material 94 horizontally on the apparatus, it is temporarily supported on a plate or rest 135, disposed centrally between the side plates 121 and 123 and having a cylindrical shank 137 depending from its under surface. The shank 137 fits slidably within a sleeve 139 secured in any desirable manner to the table 13, preferably by a pin 141 releasably locked by the set screw 142 within a cooperating aperture passing through the table 13 and the bearing 47. A spring 143 is coiled about the shank 137 between the fixed collar 144 and the top of the sleeve 139 and constantly urges the plate into its uppermost position, as shown in Fig. 1. A pin 145, fixed to the shank 137, slides within the vertical slot 147 formed in the sleeve 139 and thus prevents rotation of the rest. A collar 149 is fixed to the sleeve 137 by a set screw 151, and has a tubular portion 153 aligned with an aperture 155 formed in the sleeve 137 through which a pointed pin 157 is slidable. When the rest 135 moved into its retracted or inoperative position, the pointed end of the pin 157 is resiliently urged into engagement with a cooperating recess 159, formed in the shank 137, by the spring 161 secured to the projection 163 of the pin 157 and the screw 165 on the sleeve 139.

During operation of the testing apparatus, a stream of warm air, having a controlled temperature, is constantly blown against the under surface of the test sample 94, approximately at its central portion, through the continuous openings 166 and 167 formed in the plate 135 and collar 144 and connected by the flexible hose 168 and conduit 169 to a suitable air supply, not shown. This air stream buoyantly supports the test sample in an even plane notwithstanding any slack in the sample due to stretching and induces no frictional resistance which in itself may cause or contribute to the rupture of the sample tested. In addition, the warm air stream serves to indicate the first sign of rupture of the test sample by passing upwardly through any break in the sheet and fogging the glass or metallic member 171 supported by the bracket 173 and the standard 175 approximately centrally above the test apparatus. To record the flexing strokes to which the sample is subjected, a counter device 177 is secured to the table 13 by the same bolts 43 which are employed for holding the brackets 39, and is provided with a lever arm 179 disposed in the path of the side plate 23. As the plate 23 reciprocates, it engages the arm 179 and thus causes a stroke to be recorded by the counter 177. If desired a lamp may be also supported by the bracket 173 to aid in viewing the flexing and sample rupture.

In use, samples of cellophane or other test materials, which have been subjected to desired conditions of temperature and humidity to bring about equilibrium prior to testing, are cut to a desired test size, as for example, 7¼" by 10". The sample 94 is placed on the rest 135 with its longest dimension (10") disposed parallel to the side plates 21 and 23. The rest 135 is automatically elevated by the spring 143 as the pin 157 is withdrawn from the depression 159 and the test sample is disposed in a plane approximately parallel to the upper surface of the jaw 79. The edges of the sample are placed between the jaws 79 and 81 of each of the gripping mechanisms and the shafts 121 are rotated to cause their respective cams 113 and 115 to bear against the inclined surfaces 131 of the upper jaws 87 and effect a clamping of the sample as shown in Figs. 1 and 3. The rest 135 is manually depressed against the force of the spring 143 until the pin 157 is resiliently urged into the recess 159. The motor of the apparatus is then energized to cause the gripping mechanisms to reciprocate in parallel linear paths in the plane of the sample and cause the test sample to flex until ruptured as heretofore described, with the flexing strokes being automatically recorded by the counter 177. During the testing, warm air is discharged through the opening 166 against the central area of the under surface of the sheet. This air stream tends to maintain the sample in an even plane notwithstanding any stretching of the sheet due to atmospheric or the tensioning effect of the reciprocating side plates. Preferably the apparatus described above is portable so that tests may be conducted in high or low humidity cabinets, in a low temperature cabinet, or under standard conditions of 75° F. and 45% relative humidity when cellophane film is under study. Regardless of the temperature or humidity conditions of testing, the apparatus causes the test samples to flex in the center section and thus provides a true test of the durability of the material.

It is of course obvious that testing may be accomplished by reciprocating only one of the side plates 21 and 23 while the other of the plates remain stationary. This mode of operation of the device is obtained by merely disconnecting either the lever 71 or 73 from its respective wheel 61 and side plates. Further, if desired, the apparatus may be tilted on its side so that the gripping jaws are in vertically spaced relationship. In this case, the plate 135 and its supporting and actuating structure, including the air stream means, may be eliminated from the device.

It is seen from the above description that the objects of the invention are well fulfilled by the structure described. The description is intended to be illustrative only and it is to be understood that changes and variations may be made without departing from the spirit and scope of the invention as defined by the appended claims.

I claim:

1. A sheet material testing apparatus including a pair of laterally spaced supporting members, opposing sheet material gripping jaws carried by said supporting members and adapted to engage with the longitudinal edge portions of a sheet material to be tested for supporting the same in extended position between said members, means mounting said members for reciprocating movement in substantially parallel relationship, means for concomitantly reciprocating said supporting members in opposite directions along planes substantially parallel to the longitudinal edges of the sheet material being tested, and means for effecting a buoyant support of the central area of the sheet material as said supporting members are reciprocated, said last mentioned means including a conduit opening between said supporting members and adapted to direct a fluid against one side of the sheet material.

2. A sheet material testing apparatus including a pair of laterally spaced supporting members, opposing sheet material gripping jaws carried by said supporting members and adapted to engage with the longitudinal edge portions of a sheet material to be tested for supporting the same in extended position between said members, means mounting said members for reciprocating movement in substantially parallel relationship, means for concomitantly reciprocating said supporting members in opposite directions along planes substantially parallel to the longitudinal edges of the sheet material being tested, means for effecting a buoyant support of the central area of the sheet material as said supporting members are reciprocated, said last mentioned means including a conduit opening between said supporting members and adapted to deliver heated air against one side of the sheet material, and rupture indicating means disposed outwardly of said supporting members and opposite said air delivery conduit, said indicating means being adapted to become fogged by said heated air as the sheet material under test ruptures.

3. A sheet material testing apparatus including a pair of laterally spaced supporting members, opposing sheet material gripping jaws carried by said supporting members and adapted to engage with the longitudinal edge portions of a sheet material to be tested for supporting the same in extended position between said members, a plate disposed between said members, means for moving said plate to and from a position coplanar with said gripping jaws, said plate being adapted to support the sheet material in an even plane during the gripping of the same by said gripping jaws, means mounting said members for reciprocating movement in substantially parallel relationship, means for concomitantly reciprocating said supporting members in opposite directions along planes substantially parallel to the longitudinal edges of the sheet material being tested, a conduit extending through said plate and adapted to deliver a heated fluid against one side of the sheet material for buoyantly supporting the same, and rupture indicating means disposed outwardly of said supporting members and opposite said fluid delivery conduit, said indicating means being adapted to become fogged by said heated fluid as the sheet material ruptures.

References Cited in the file of this patent
UNITED STATES PATENTS

| 1,890,923 | Wilson | Dec. 13, 1932 |
| 2,276,036 | Hanna et al. | Mar. 10, 1942 |
| 2,448,133 | Yorgiadis | Aug. 31, 1948 |
| 2,667,069 | Ramos et al. | Jan. 26, 1954 |
| 2,709,915 | Conti | June 7, 1955 |

FOREIGN PATENTS

| 512,035 | Great Britain | Aug. 28, 1939 |